(12) United States Patent
Bergman et al.

(10) Patent No.: US 9,306,644 B2
(45) Date of Patent: Apr. 5, 2016

(54) METHODS AND DEVICES FOR UPLINK MULTI-ANTENNA TRANSMISSIONS IN A TELECOMMUNICATION SYSTEM

(75) Inventors: Johan Bergman, Stockholm (SE); Johan Hultell, Solna (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 46 days.

(21) Appl. No.: 14/114,370

(22) PCT Filed: Feb. 13, 2012

(86) PCT No.: PCT/SE2012/050139
§ 371 (c)(1),
(2), (4) Date: Oct. 28, 2013

(87) PCT Pub. No.: WO2012/148341
PCT Pub. Date: Nov. 1, 2012

(65) Prior Publication Data
US 2014/0050278 A1    Feb. 20, 2014

Related U.S. Application Data

(60) Provisional application No. 61/480,667, filed on Apr. 29, 2011.

(51) Int. Cl.
*H04B 7/02* (2006.01)
*H04L 1/02* (2006.01)
(Continued)

(52) U.S. Cl.
CPC ............ *H04B 7/0456* (2013.01); *H04B 7/0404* (2013.01); *H04B 7/0421* (2013.01); *H04B 7/0634* (2013.01); *H04B 7/0689* (2013.01); *H04W 52/545* (2013.01)

(58) Field of Classification Search
CPC .. H04B 7/0404; H04B 7/0421; H04B 7/0456; H04B 7/0634; H04B 7/0689; H04W 52/545
USPC .......................................................... 375/267
See application file for complete search history.

(56) References Cited

U.S. PATENT DOCUMENTS

2003/0119452 A1* 6/2003 Kim et al. ........................ 455/69
2010/0183085 A1* 7/2010 Taoka et al. ................... 375/260
(Continued)

FOREIGN PATENT DOCUMENTS

| EP | 2169845 A1 | 3/2010 |
|---|---|---|
| WO | 2011043720 A1 | 4/2011 |
| WO | 2012109529 A1 | 8/2012 |

OTHER PUBLICATIONS

R1-110315, "On Downlink PCI Feedback Scheme," Huawei, HiSilicon, 3GPP TSG RAN WG1 Meeting #63bis, Dublin, Ireland, Jan. 17-21, 2011.*

(Continued)

*Primary Examiner* — Nader Bolourchi
(74) *Attorney, Agent, or Firm* — Patents on Demand, P.A.; Brian K. Buchheit; Scott M. Garrett

(57) ABSTRACT

The disclosure relates to controlling uplink transmissions according to closed loop multi-antenna techniques such as closed loop uplink transmit diversity and uplink multiple-input multiple-output (MIMO). An exemplary method for use in a user equipment (81) configured for multi-antenna transmissions comprises a step of estimating (62) reception quality of a physical channel carrying pre-coding weight information to the user equipment (61). The method further comprises a step of determining (64) that the reception quality of the physical channel is inferior if the estimated reception quality is below a threshold and otherwise considering (65) the reception quality of the physical channel to be sufficient, in a further step the UE (61) applies (52) the pre-coding weight information received on the physical channel for uplink transmission only if the reception quality of the physical channel is considered to be sufficient.

21 Claims, 7 Drawing Sheets

(51) Int. Cl.
*H04B 7/04* (2006.01)
*H04B 7/06* (2006.01)
*H04W 52/54* (2009.01)

(56) References Cited

U.S. PATENT DOCUMENTS

2012/0195224 A1* 8/2012 Kazmi et al. ............... 370/252
2012/0207045 A1* 8/2012 Pelletier et al. ............ 370/252

OTHER PUBLICATIONS

R1-111270, "Pre-coding weight generation in CLTD," Ericsson, ST-Ericsson, 3GPP TSG RAN WG1 Meeting #65, Barcelona, Spain, May 9-13, 2011.*

Unknown, Author. "Pre-coding Selection for CLTD." Ericsson, ST-Ericsson. R1-110488. 3GPP TSG RAN WG1 Meeting #63bis. Jan. 17-21, 2011. Dublin, Ireland.

Unknown, Author. "On the Quality of PCI Feedback in CLTD." Ericsson, ST-Ericsson. R1-111752. 3GPP TSG RAN WG1 Meeting #65. May 9-13, 2011. Barcelona, Spain.

Unknown, Author. "On the Quality of PCI Feedback in CLTD." Ericsson, ST-Ericsson. R1-112609. 3GPP TSG RAN WGI Meeting #66. Aug. 22-26, 2011. Athens, Greece.

Unknown, Author. "3rd Generation Partnership Project; Technical Specification Group Radio Access Network; Medium Access Control (MAC) protocol specification (Release 8)." 3GPP TS 25.321 V8.6.0. Jun. 2009.

Unknown, Author. "3rd Generation Partnership Project; Technical Specification Group Radio Access Network; Multiplexing and channel coding (FDD) (Release 8)." Mar. 2009.

Unknown, Author. "3rd Generation Partnership Project; Technical Specification Group Radio Access Network; Universal Terrestrial Radio Access (UTRA); Uplink transmit diversity for High Speed Packet Access (HSPA) (Release 10)." 3GPP TR 25.863 V10.0.0. Jul. 2010.

Unkown, Author. "3rd Generation Partnership Project; Technical Specification Group Radio Access Network Physical channels and mapping of transport channels onto physical channels (FDD) (Release 8)." 3GPP TS 25.211 V8.0.0. Mar. 2008.

* cited by examiner

METHODS AND DEVICES FOR UPLINK MULTI-ANTENNA TRANSMISSIONS IN A TELECOMMUNICATION SYSTEM

TECHNICAL FIELD

The embodiments described herein relate to uplink multi-antenna transmissions in a telecommunication system and in particular to methods and devices for closed loop solutions such as closed loop uplink transmit diversity and uplink multiple-input multiple-output (MIMO).

BACKGROUND

There is a continuous development of new generations of mobile communications technologies to cope with increasing requirements of higher data rates, improved efficiency and lower costs. High Speed Downlink Packet Access (HSDPA) and High Speed Uplink Packet Access (HSUPA), together referred to as High Speed Packet Access (HSPA), are mobile communication protocols that were developed to cope with higher data rates than original Wideband Code Division Multiple Access (WCDMA) protocols were capable of. The 3rd Generation Partnership Project (3GPP) is a standards-developing organization that is continuing its work of evolving HSPA and creating new standards that allow for even higher data rates and improved functionality.

In a radio access network implementing HSPA, a user equipment (UE) is wirelessly connected to a base station commonly referred to as a NodeB (NB). A base station is a general term for a radio network node capable of transmitting radio signals to a UE and receiving signals transmitted by a UE.

Recently 3GPP has started a number of work items targeting uplink multi-antenna solutions for a standard release 11. In particular, there are work items targeted for open and closed loop uplink transmit diversity as well as a study item on uplink multiple-input-multiple-output (MMO) transmission.

With uplink transmit diversity, UEs that are equipped with two or more transmit antennas are capable of utilizing all of them for uplink transmissions. This is achieved by multiplying a UE output signal with a set of complex pre-coding weights, a so-called pre-coding vector with one pre-coding weight for each physical transmit antenna. The rationale behind uplink transmit diversity is to adapt the pre-coding weights so that user equipment and network performance is maximized. Depending on UE implementation the antenna pre-coding weights may be associated with different constraints. Within 3GPP two classes of transmit diversity are considered:

Switched antenna transmit diversity, where the UE at any given time-instance transmits from one of its antennas only.

Beamforming where the UE at a given time-instance can transmit from more than one antenna simultaneously. By means of beamforming it is possible to shape an overall antenna beam in the direction of a target receiver. It can be noted that switched antenna transmit diversity can be seen as a special case of beamforming where one of the pre-coding weights is 1 (i.e. switched on) and the pre-coding weight of any other antenna of the UE is 0 (i.e. switched off).

Transmit diversity schemes can be seen as a generic framework for mapping symbols to antenna ports. With respect to beamforming techniques, rank-1 transmissions, the same symbols are mapped to the several physical antennas and by adapting the pre-coding vector so that it matches the "radio" channel the UE and network performance, e.g., coverage, throughput, transmit power, etc., can be improved. More specifically, this is achieved by multiplying the signal with a set of complex weights $w_i$, one for each physical antenna. Mathematically, this can be written as follows $$\begin{bmatrix} y_1 \\ M \\ y_N \end{bmatrix} = \begin{bmatrix} w_1 \\ M \\ w_N \end{bmatrix} s = ws$$

where $y_l$ is the signal at the lth antenna port and where w is typically referred to as the pre-coding or beamforming vector. As noted above the fundamental idea with uplink transmit diversity is to exploit the properties in the effective channel and ensure that coherent combining is achieved at the receiver. The term effective channel here incorporates effects of transmit and receive antennas as well as the radio channel between the transmitting and receiving antennas.

For uplink MIMO, different data is transmitted from different virtual antennas in so-called streams. Each virtual antenna corresponds to a different pre-coding vector. Note that closed loop beamforming can be viewed as a special case of uplink MIMO where no data is scheduled on all but one of the possible virtual antennas.

MIMO technology is mainly beneficial in situations where the "composite channel" is strong and has high rank. The term composite channel includes the potential effects of transmit antenna(s), power amplifiers (PAs), as well as the radio channel between the transmitting and receiving antennas. The rank of the composite channel depends on the number of uncorrelated paths between the transmitter and the receiver. Single-stream transmissions, i.e. beamforming techniques, are generally preferred over MIMO transmissions in situations where the rank of the composite channel is low e.g. where there is a limited amount of multi-path propagation and cross polarized antennas are not used, and/or the path gain between the UE and the NodeB is weak.

In closed-loop techniques, such as closed loop transmit diversity or uplink MIMO, the network decides or recommend the pre-coding vector(s) that the UE should apply by means of a physical channel. One example of such a physical channel would be to rely on a Fractional Dedicated Physical Channel (F-DPCH)-like channel or a grant channel, such as an Enhanced Dedicated Channel Absolute Grant Channel (E-AGCH)-like or an Enhanced Dedicated Channel Relative Grant Channel (E-RGCH)-like channel. A serving NodeB could e.g. signal a recommended pre-coding vector to a UE on the physical channel by means of an explicit or implicit indication of the recommended pre-coding vector(s).

The terms "pre-coding weight information", "pre-coding information", "Pre-coding Control Information (PCI)", "pre-coding command", "pre-coding vector command" and "pre-coding information feedback" are used synonymously herein to refer to information transmitted on the above mentioned physical channel in order for the network to indicate pre-coding weights/one or several pre-coding vectors that a UE is recommended to use for uplink transmission. The term "pre-coder" is used herein to refer to a set of pre-coding weights which can comprise one or several pre-coding vectors.

Regardless of the physical channel that is used to signal feedback from the network to the UE one key aspect of closed-loop schemes is that a sufficient reception quality of the feedback quality can be ensured. In fact as the reception quality of the physical channel carrying the feedback information deteriorates the reliability of the signalled pre-coding vector(s) becomes increasingly unreliable and at some point the usage of closed loop beamforming or uplink MIMO may become harmful. This is because the UE will, in case of unreliable pre-coding commands, start to direct its beam in a random direction which may cause excessive amounts of interference in neighbouring cells. Moreover, the variations in interference will become more rapid. Also, the performance and Rise-over-Thermal (RoT) utilization may be reduced because the received power from a given UE will experience faster variations due to the rapid changes in the pre-coding weights. Among other things this may result in that inner loop power control is unable to track the channel at low Doppler spreads.

Another design choice related to closed loop transmit diversity schemes and MIMO schemes is the physical channel structure and more specifically which physical channels that should be multiplied with the pre-coding vector. According to an example architecture one of the pilots transmitted on a Dedicated Physical Control Channel (DPCCH) and all of the other physical channels are transmitted using a certain pre-coding vector, often referred to as the primary pre-coding vector. The other pilot transmitted on the other secondary DPCCH (S-DPCCH) is transmitted with another pre-coding vector, which e.g. is orthogonal to the primary pre-coding vector. According to an alternative example architecture the pilots are non-precoded and the pre-coding is only applied to the data related channels. Note that 3GPP is considering an architecture based on pre-coded pilots for closed loop transmit diversity. One of the main benefits with an architecture based on pre-coded DPCCH pilots is that the pre-coding vector that the UE has applied does not need be known by the network. This is because channel estimates used for demodulation can be on the pre-coded DPCCH pilot that is pre-coded in the same way as the data channels.

For closed loop transmit diversity and UL MIMO, it is important that the reception quality of the physical channel carrying the pre-coding information can be maintained at a reasonable level. Additionally, the base stations that are responsible for generating the pre-coding commands need to estimate the effective channel, i.e. what the channel looks like when no pre-coding has been applied, in order to determine suitable pre-coding vector(s).

Thus there is a desire for schemes and devices that assist in determining and applying suitable pre-coding vectors in communication systems applying closed loop multi-antenna transmission techniques such as closed loop uplink transmit diversity and uplink MIMO.

SUMMARY

It is an object to provide methods and apparatuses that allow for improved control in connection with uplink multi-antenna transmissions.

The above stated object is achieved by means of methods, and apparatuses according to the independent claims.

A first embodiment provides a method for use in a user equipment (UE) configured for multi-antenna transmissions in a telecommunication system. The method comprises a step of estimating reception quality of a physical channel carrying pre-coding weight information to the UE. A further step of the method involves determining that the reception quality of the physical channel is inferior if the estimated reception quality is below a threshold and otherwise considering the reception quality of the physical channel to be sufficient. The method also comprises a step of applying the pre-coding weight information received on the physical channel for uplink transmission only if the reception quality of the physical channel is considered to be sufficient.

A second embodiment provides a method for use in a UE configured for multi-antenna transmissions in a telecommunication system. The method comprises a step of estimating reception quality of a physical channel carrying pre-coding weight information to the UE. The method further comprises a step of determining that the reception quality of the physical channel is inferior if the estimated reception quality is below a threshold and otherwise considering the reception quality of the physical channel to be sufficient. According to another step of the method information about the estimated reception quality of the physical channel is signalled to a base station controlling generation of pre-coding weights.

Third and fourth embodiments provide methods for use in a base station for controlling UEs configured for multi-antenna transmissions in a telecommunication system. The methods comprise a step of transmitting, on a physical channel, information on pre-coding weights for uplink transmission to a UE and a step of detecting whether reception quality of the physical channel is inferior or sufficient. According to the third embodiment it is detected whether reception quality of the physical channel is inferior or sufficient based on signalling from the UE via a transmit power control, TPC, field of a secondary uplink pilot channel. According to the fourth embodiment it is detected whether reception quality of the physical channel is inferior or sufficient based on a detected pilot pattern on a secondary uplink pilot channel from the user equipment, where different pilot patterns are indicative of whether the reception quality of the physical channel is sufficient or inferior.

A fifth embodiment provides a UE configured for multi-antenna transmissions in a telecommunication system. The UE is further configured to estimate reception quality of a physical channel carrying pre-coding weight information to the user equipment. The UE is also configured to determine that the reception quality of the physical channel is inferior if the estimated reception quality is below a threshold and otherwise consider the reception quality of the physical channel to be sufficient. The UE is further configured to apply the pre-coding weight information received on the physical channel for uplink transmission only if the reception quality of the physical channel is considered to be sufficient.

A sixth embodiment provides a UE configured for multi-antenna transmissions in a telecommunication system. The UE is further configured to estimate reception quality of a physical channel carrying pre-coding weight information to the UE and to determine that the reception quality of the physical channel is inferior if the estimated reception quality is below a threshold and otherwise consider the reception quality of the physical channel to be sufficient. The UE is also configured to signal information about the estimated reception quality of the physical channel to a base station controlling generation of pre-coding weights.

Seventh and eighth embodiments provide base stations for controlling UEs configured for multi-antenna transmissions in a telecommunication system. The base stations are configured to transmit, on a physical channel, information on pre-coding weights for uplink transmission to a UE and to detect whether the reception quality of the physical channel is inferior or sufficient. According to the seventh embodiment the base station is configured to detect whether the reception quality of the physical channel is inferior or sufficient based on signalling from the UE via a TPC field of a secondary uplink pilot channel. According to the eighth embodiment the base station is configured to detect whether the reception quality of the physical channel is inferior or sufficient based on a detected pilot pattern on a secondary uplink pilot channel from the user equipment, wherein different pilot patterns are indicative of whether the reception quality of said physical channel is sufficient or inferior.

An advantage of some of the embodiments of this disclosure is that smaller variations in intra and inter-cell interference levels may be achieved. By ensuring that the UE does not apply the decoded pre-coding weight information for uplink transmission if the estimated reception quality of the physical channel carrying the pre-coding weight information is below a certain quality, situations where the UE direct the beam inappropriately and cause undesirably high interference in neighbouring cells may be avoided. Thus the performance of the UE may be improved.

Another advantage of some of the embodiments described herein is that the UE is enabled to consider the pre-coding information feedback transmitted by the network only if the estimated downlink quality is sufficient, i.e. above some quality threshold. The UE can then, when the pre-coding information feedback is considered, apply the received pre-coding weight information for uplink transmission by using the pre-coding vector(s) indicated by the pre-coding weight information when transmitting in the uplink.

A further advantage of some of the embodiments of this disclosure is that a base station, such as a Node-B, that generates the pre-coding vectors can be made aware of that the reception quality of the physical channel is inferior and thus also dynamically adjust the transmit power of the related physical downlink channel, i.e. the physical channel carrying the pre-coding weight information. In several embodiments this is achieved while still allowing the base station to use all symbols on the secondary uplink pilot (S-DPCCH) as pilots. In some embodiments pre-coding weights applied by the UE can furthermore be derived by the base stations since the TPC field on the S-DPCCH is sent non-precoded. This can be used by both the base station controlling the generation of the pre-coding weight information and the base stations in the active set that are unaware of the pre-coding weight information sent to the UE.

Further advantages and features of embodiments of this disclosure will become apparent when reading the following detailed description in conjunction with the drawings.

DETAILED DESCRIPTION

Figure 1:
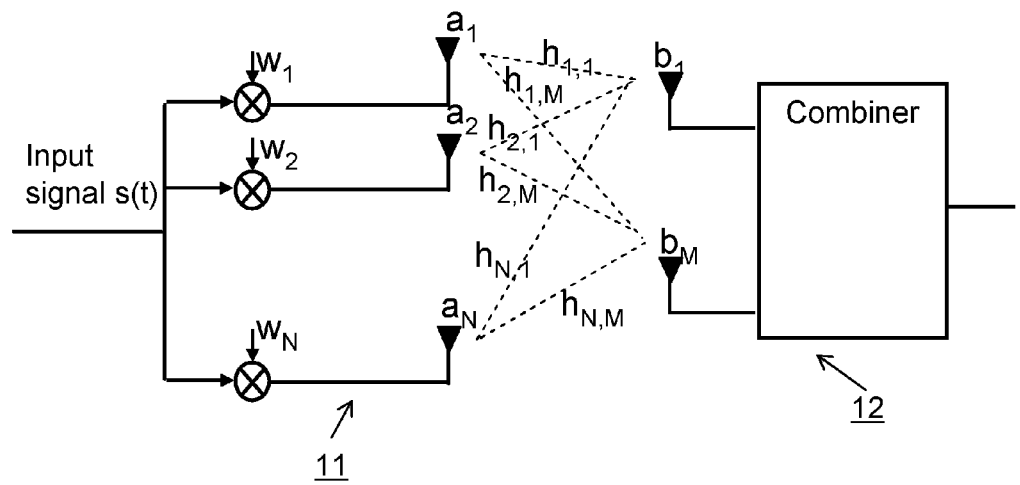
FIG. 1 is a schematic block diagram illustrating an exemplary transmit diversity scheme.

The embodiments of this disclosure will now be described more fully hereinafter with reference to the accompanying drawings, in which different example embodiments are shown. These example embodiments are provided so that this disclosure will be thorough and complete and not for purposes of limitation. In the drawings, like reference signs refer to like elements.

The inventors have realized that there are good reasons for ensuring that the UE does not apply the decoded pre-coding vector if the estimated reception quality of the physical channel carrying the pre-coding information is below a certain quality. Embodiments which will be described in further detail below provide methods and apparatuses enabling a UE to consider received pre-coding weight information only if estimated reception quality of the pre-coding weight information sent from the network is considered to be sufficient by the UE. The quality estimate could be based on the downlink quality of the physical channel carrying the pre-coding weight information. Furthermore the inventors have realized that it is desirable for a base station generating pre-coding weight information to know the pre-coding vector that the UE has applied, or at least that it is likely that the UE has decoded the true pre-coding vector, i.e. the pre-coding vector sent by the serving base station. This knowledge is useful to the base station in order to estimate the effective channel and to determine suitable pre-coding vectors. Thus some embodiments which will be described in further detail below provide methods and apparatuses that enable signalling information about the estimated reception quality of the physical channel carrying the pre-coding weight information from the UE to the base station controlling generation of pre-coding weights. Although most of the embodiments described in detail below are described in a context of closed loop uplink transmit diversity embodiments of this disclosure are equally applicable to both closed loop uplink transmit diversity schemes and uplink MIMO.

FIG. 1 is a schematic block diagram illustrating an exemplary transmit diversity system in which different embodiments of this disclosure may be implemented. FIG. 1 shows a transmitting unit 11, such as a UE, comprising physical transmit antennas $a_1, a_2, \ldots, a_N$. An input signal s(t) to be transmitted is mapped to N antenna ports via complex weights $w_1, w_2, \ldots, w_N$ prior to transmission from a respective physical antenna. Note that in the example illustrated in FIG. 1 each antenna port corresponds to a physical transmit antenna. FIG. 1 also illustrates a receiving unit 12, such as a NodeB, comprising receive antennas $b_1, \ldots, b_M$. The composite channel between the transmitting unit and the receiving unit comprises wireless channels $h_{i,j}$, where $i=1, \ldots, N$ and $j=1, \ldots, M$, between the different transmit antennas $a_1, a_2, \ldots, a_N$ and receive antennas $b_1, \ldots, b_M$ as illustrated in FIG. 1.

Figure 2:
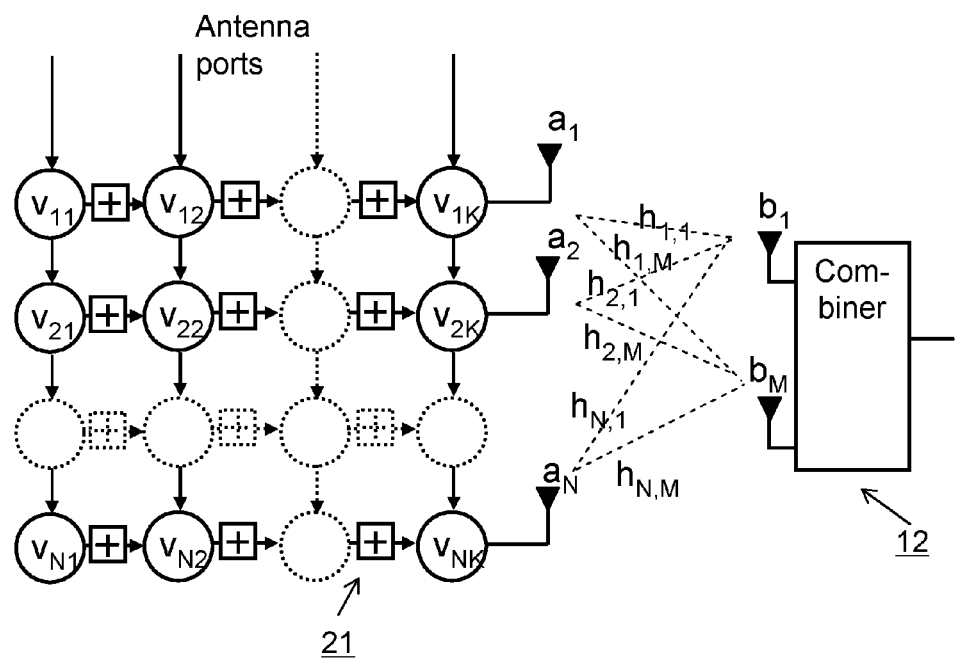
FIG. 2 is a schematic block diagram illustrating mapping of antenna ports to physical antennas.

FIG. 2 is a schematic block diagram illustrating an alternative system in which different embodiments of this disclosure may be implemented. FIG. 2 discloses a transmitting unit 21 such as a UE, comprising physical transmit antennas $a_1, a_2, \ldots, a_N$ and a receiving unit 12, such as a NodeB, comprising receive antennas $b_1, \ldots, b_M$. The composite channel between the transmitting unit and the receiving unit comprising wireless channels $h_{i,j}$, where i=1, ..., N and j=1, ..., M, is also illustrated in FIG. 2. In contrast to the transmitting unit 11 of FIG. 1, the transmitting unit 21 of FIG. 2 comprises K antenna ports which are mapped to the N physical antennas as illustrated in FIG. 2.

Figure 3:
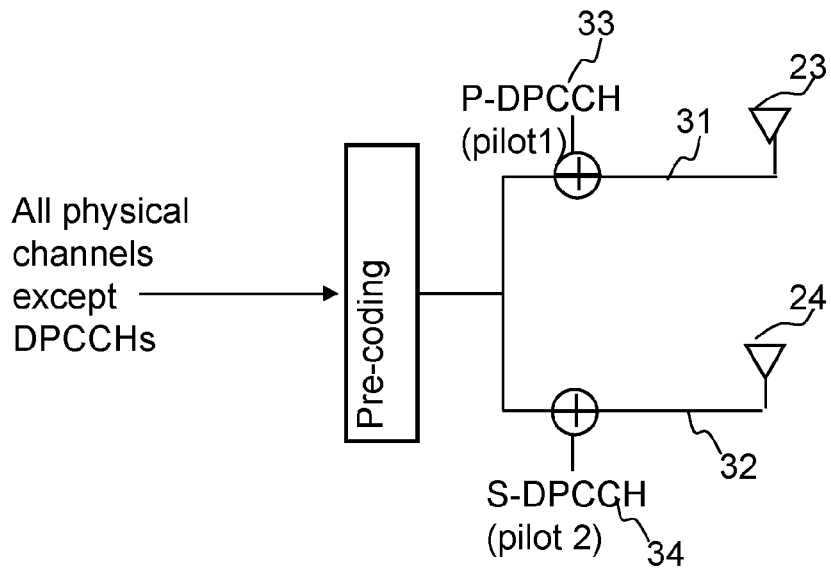
FIG. 3 is a schematic block diagram illustrating an embodiment of a user equipment architecture supporting closed loop beamforming with non-precoded pilots.
Figure 4:
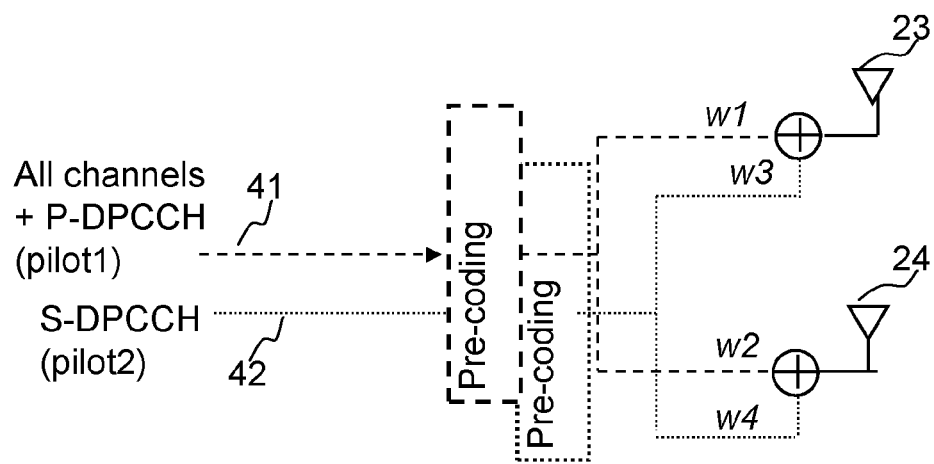
FIG. 4 is a schematic block diagram illustrating an alternative embodiment of a user equipment architecture supporting closed loop beamforming with pre-coded pilots.

FIGS. 3 and 4 illustrate two possible UE architectures that can support closed loop beamforming. Both FIG. 3 and FIG. 4 illustrate that the UE comprises two physical antennas 23 and 24. FIG. 3 illustrates a structure based on non-pre-coded (DPCCH) pilots 33 and 34. In the example of FIG. 3 the pre-coding is only applied to the data related channels. FIG. 4 shows a UE architecture with pre-coded pilots. In this structure one of the DPCCH pilots and all of the other physical channels are transmitted using a certain, so-called primary, pre-coding vector and the other DPCCH pilot is transmitted with another, e.g. orthogonal pre-coding vector. As mentioned above, one of the main benefits with an architecture based on pre-coded DPCCH pilots is that the pre-coding vector that the UE has applied does not need be known by the network. This is because the channel estimates used for demodulation can be on the pre-coded DPCCH pilot that is pre-coded in the same way as the data channels; see P-DPCCH in FIG. 4.

Figure 5:
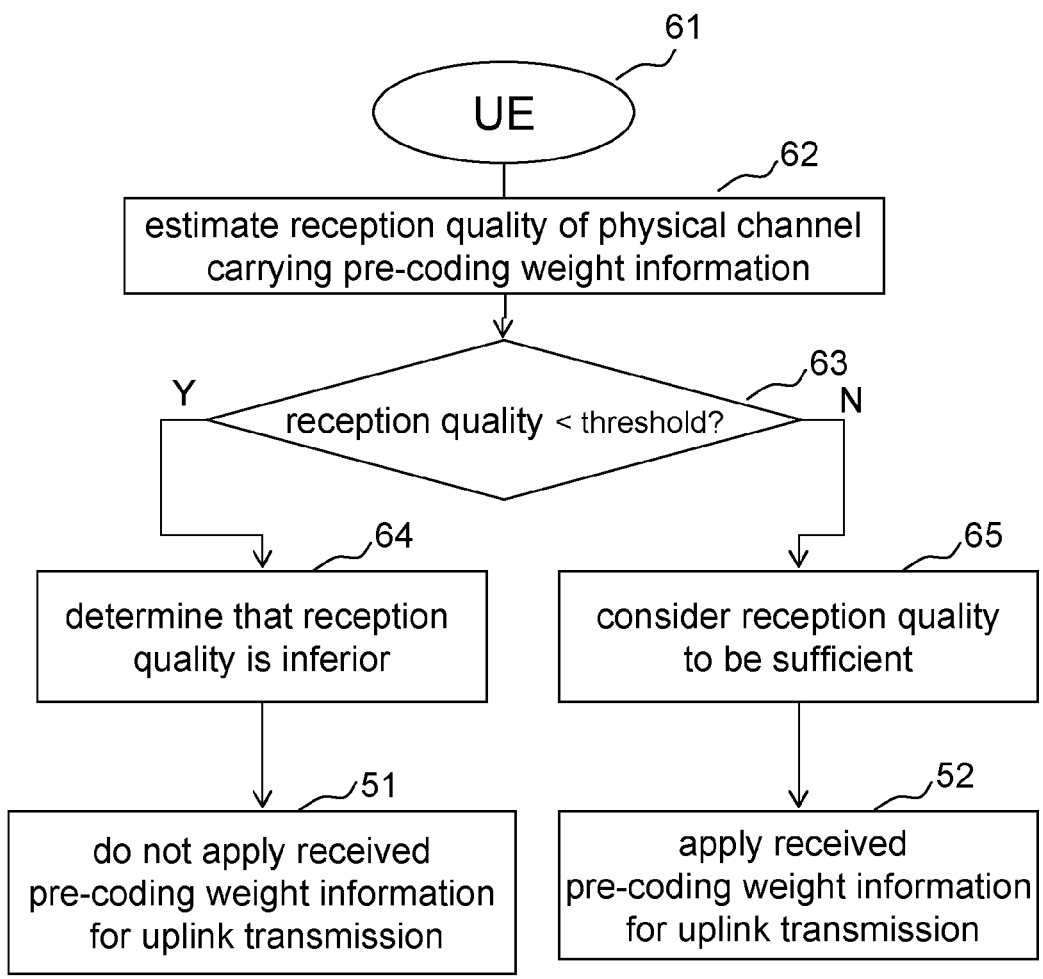
FIG. 5 is a flow diagram illustrating an embodiment of a method for use in a user equipment configured for multi-antenna transmissions.

FIG. 5 is a flow diagram illustrating an embodiment of a method for use in a UE 61 configured for multi-antenna transmissions and operating according to a closed-loop technique. Thus the UE 61 receives pre-coding weight information indicating, either explicitly or implicitly, one or several pre-coding vectors recommended for uplink transmission by a serving base station. The method comprises a step 62 of estimating reception quality of a physical channel carrying the pre-coding weight information to the UE. The method also comprises a step 64 of determining that the reception quality of the physical channel is inferior if the estimated reception quality is below a threshold. If the estimated reception quality is not below the threshold, the reception quality of the physical channel is considered to be sufficient according to a step 65. In FIG. 5 a step 63 is illustrated in which the UE checks whether the reception quality is below the threshold or not. Only if the reception quality of the physical channel is considered to be sufficient is the pre-coding weight information received on the physical channel for uplink transmission in a step 52. Applying the received pre-coding weight information for uplink transmission implies using the pre-coding vector(s) indicated by the received pre-coding weight information when transmitting in the uplink. If it is determined that the reception quality of the physical channel is inferior in the step 64, the pre-coding weight information is not applied for uplink transmission, i.e. the pre-coding weight information is not considered for selection of pre-coding vectors to be used for uplink transmission.

Consequently, according to an embodiment, in line with the method illustrated in FIG. 5, the UE 61 applies the received pre-coding vectors to its uplink transmission if the reception quality of the physical channel is determined to be acceptable. Otherwise the UE does not apply the received pre-coding vectors.

Figure 6:
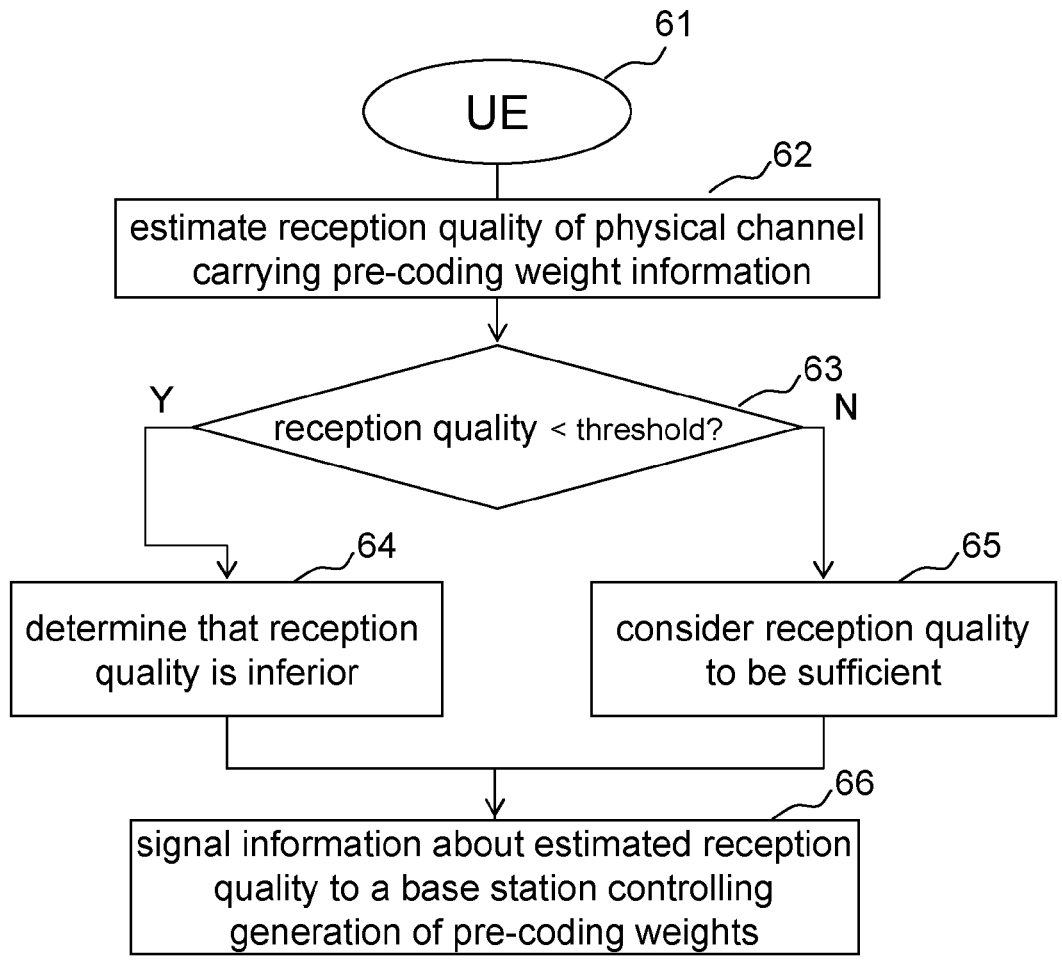
FIG. 6 is a flow diagram illustrating an alternative embodiment of a method for use in a user equipment configured for mufti-antenna transmissions.

FIG. 6 is a flow diagram illustrating an alternative embodiment of a method for use in the UE 61. The method illustrated in FIG. 6 comprises the same steps 62, 63, 64 and 65 as illustrated in FIG. 5 and described above. The method in FIG. 6 also comprises a step 66 of signalling information about the estimated reception quality of the physical channel to a base station controlling generation of pre-coding weights. Generally the information about the estimated reception quality would be some kind of explicit or implicit indication of whether the UE considers the reception quality of the physical channel carrying the pre-coding weight information to be inferior or sufficient. According to an example embodiment, the quality of downlink reception is signalled from the UE to the network via a transmit power control (TPC) field in a secondary uplink pilot. Further examples and a more detailed description of different ways of carrying out the step 66 will be explained below.

According to further alternative embodiments the method illustrated in FIG. 5 could be modified by adding the step 66 of FIG. 6 to indicate to the network whether the reception quality is considered by the UE to be sufficient or inferior.

Now different variants of carrying out the steps 62-65 will be discussed below.

In one embodiment the UE measures the downlink quality of the physical channel carrying pre-coding weight information. The pre-coding weight information may be carried on an F-DPCH-like channel, the downlink DPCCH (for UEs configured with Dedicated Channel (DCH) only, i.e. not configured with HSPA), or on a grant like channel e.g. the absolute or relative grant channel. The estimated quality is denoted $Q_{est}$. The estimated quality could be based on, e.g. signal-to-interference ratio (SIR) or bit error probability of an F-DPCH like channel where only a subset of the symbols are used or the quality of some other similar downlink channel (e.g., F-DPCH). If the estimated quality $Q_{est}$ is below some threshold $Q^*$ the reception quality of the physical channel carrying the pre-coding weight information is classified as being inferior. Otherwise the quality is considered as sufficient. The threshold $Q^*$ may be some predefined threshold, such as a SIR-threshold. According to some embodiments, if the Qest<Q* the UE should not apply the received pre-coding vectors to its uplink transmission.

Now some aspects relating to the step 66 will be discussed. There are different ways of carrying out the step 66 as well as different variants of arrangements that can be used for this purpose.

The base station (e.g. a Node-B) is enabled to understand whether the pre-coding weight information is sufficient or not by introducing means for the UE to signal corresponding link quality information to the network. In one embodiment, the link quality information is signalled to the Node-B(s) controlling the generation of the pre-coding vectors either explicitly or implicitly.

In one embodiment the quality of downlink reception is signalled to the network by reusing the transmit power control (TPC) field in the secondary uplink pilot (S-DPCCH). The UE could signal to the base station that the reception quality of the physical channel is considered to be sufficient by setting bits in the TPC field to a first predetermined bit combination. The bit combination could for example be '00' as long as the quality is sufficient. Likewise the UE could signal that the reception quality is determined to be inferior by setting bits in the TPC field to a second predetermined bit combination. If the estimated quality is inferior Qest<Q* this could be signalled by '11' or all combinations except '00' (assuming that '00' is used to signal sufficient quality). One benefit of this embodiment is that bits in the TPC field of the S-DPCCH are hard-coded. This would enable that Node-Bs exploit these bits for channel estimation. The vast majority of the time the bits will be '00' in the example presented above. Consequently this knowledge may be used when performing channel estimation. Also, the Node-B(s) generating the pre-coding vectors can use this information for dynamically adjusting the transmit power or possibly the offset with respect to some other power controlled channel that they use when transmitting the pre-coding vectors.

In another variant of the embodiment described above the TPC field on the S-DPCCH is transmitted in a non-pre-coded fashion or alternatively with a fixed pre-coding vector. This would furthermore allow the Node-B to determine the pre-coding vector applied by the UE by comparing the symbols in the TPC field with some of the bits in the S-DPCCH which are pre-coded with the pre-coding vector applied by the UE. By comparing the phase of the symbols the Node-B could possibly derive the pre-coding vector that has been applied. Note that this only would be possible for pre-coding codebooks in which the signal associated with the secondary beam is transmitted from both physical antennas.

In yet another variant of the embodiment described above the TPC field of the secondary uplink pilot (S-DPCCH) has the same bits as a TPC command sent on the primary DPCCH if the signal quality at the UE for the channel carrying the pre-coding weight information is sufficient. If the estimated quality is below the quality threshold, the bits in the TPC field on the S-DPCCH take on opposite values than the TPC bits on the primary DPCCH (e.g. if the TPC bits on the DPCCH are '11' the TPC field on the S-DPCCH will carry '11' if the signal quality at the UE exceeds the threshold and '00' if $Q_{est} < Q^*$).

In another variant of the embodiment described above the UE transmits the TPC field on the S-DPCCH only if the estimated downlink quality is judged as sufficient, i.e. the UE uses discontinuous transmission (DTX) on the TPC field on the S-DPCCH based on whether the downlink quality is judged as inferior or not. Thus information about the estimated reception quality of the physical channel carrying the pre-coding weight information may be signalled via the TPC field of the secondary uplink pilot channel by means of absence or presence of the TPC field. In this variant, the NodeB can use simple power detection in the TPC field of the S-DPCCH to detect whether the UE has detected sufficient or inferior downlink quality. Also, this DTX'ing may give a slightly lower interference level to other UEs.

In another embodiment the UE utilizes different pilot patterns on the secondary DPCCH depending on whether the downlink quality Qest exceeds the quality threshold Q*. A benefit of this approach would be that the all symbols in the S-DPCCH can be used as pilot symbols.

In still another embodiment the UE enables the Node-B to detect the downlink quality by having the UE signal the applied pre-coding weights in the TPC field of secondary uplink pilot (S-DPCCH). If the TPC field in the S-DPCCH is not pre-coded, this will result in that all Node-Bs can be aware of the pre-coding vectors that the UE has applied. Moreover, the Node-B that controls pre-coding vector generation can compare the pre-coding vector that the UE has applied with the pre-coding vector that it instructed the UE to use. By performing this comparison the Node-B can keep an estimate of the downlink quality with which the UE receives the downlink pre-coding vector commands, which is referred to as $Q_{est.Node-B}$. If $Q_{est.Node-B}$ is below some quality threshold q* then the Node-B can use this information to indicate that the downlink reception quality of the physical channel carrying the pre-coding information is inferior. Alternatively or as a complement, the Node-Bs in the active set could use the signalled pre-coding weights for determining how frequently the UE changes pre-coding vectors. By comparing this to the Doppler spread or the channel coherence time, which also can be used for determining how frequently a UE "should" update the pre-coding vectors, the Node-B can estimate whether it is likely that the downlink reception quality of the pre-coding vectors is sufficient. Note that this part would be possible for all Node-Bs in the active set since the Node-B does not need to be aware of which pre-coding vectors that was signalled. If the TPC field of the secondary DPCCH is pre-coded the Node-B first decodes the S-DPCCH, e.g. using hard-coded pilot bits in the S-DPCCH. By doing this it would get the pre-coding value signalled in the TPC field of the secondary DPCCH. Given the estimated pre-coder the Node-B could for example compute an estimate of the raw radio channel i.e. the non-pre-coded channel. This raw channel estimate could then be multiplied with the pre-coding vector that the Node-B commanded the UE apply. This pre-coded channel could then be compared with the pre-coded channel derived from the DPCCH pilots. Based on the difference the Node-B could then decide whether or not it is likely that the UE decoded the transmitted pre-coding vectors correctly.

Figure 7A:
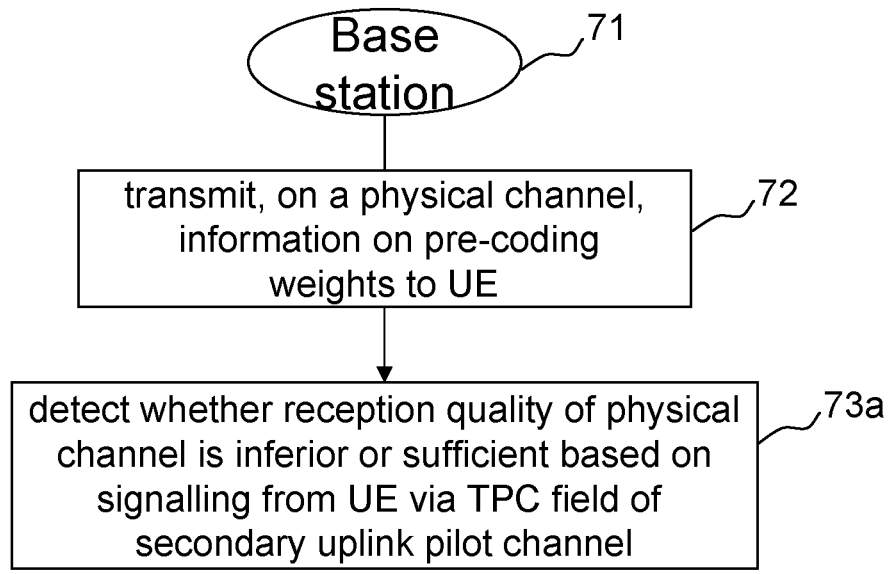
FIGS. 7a and 7b are flow diagrams illustrating alternative embodiments of a method for use in a base station controlling user equipments configured for multi-antenna transmissions.
Figure 7B:
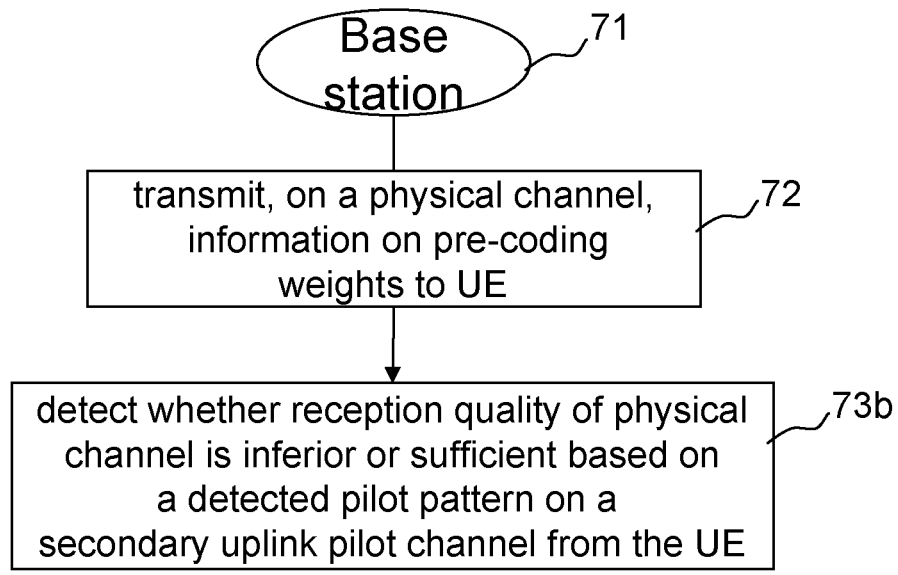

FIGS. 7a and 7b are flow diagrams illustrating exemplary alternative embodiments of a method for use in a base station (71) for controlling UEs configured for multi-antenna transmissions. According to a step 72 the base station 71 transmits, on a physical channel, information on recommended pre-coding weights for uplink transmission to a UE. Based on signalling from the UE the base station then detects whether reception quality of the physical channel is inferior or sufficient. There are different ways of performing this detection. In the embodiment illustrated in FIG. 7a the detection is based on signalling from the UE via a TPC field of a secondary uplink pilot channel in a step 73a. As mentioned above the UE may signal information about the reception quality via the TPC field in a number of different ways. In the embodiment illustrated in FIG. 7b the detection is based on a detected pilot pattern on a secondary uplink pilot channel from the UE, where different pilot patterns are indicative of whether the reception quality of the physical channel is sufficient or inferior.

Figure 8:
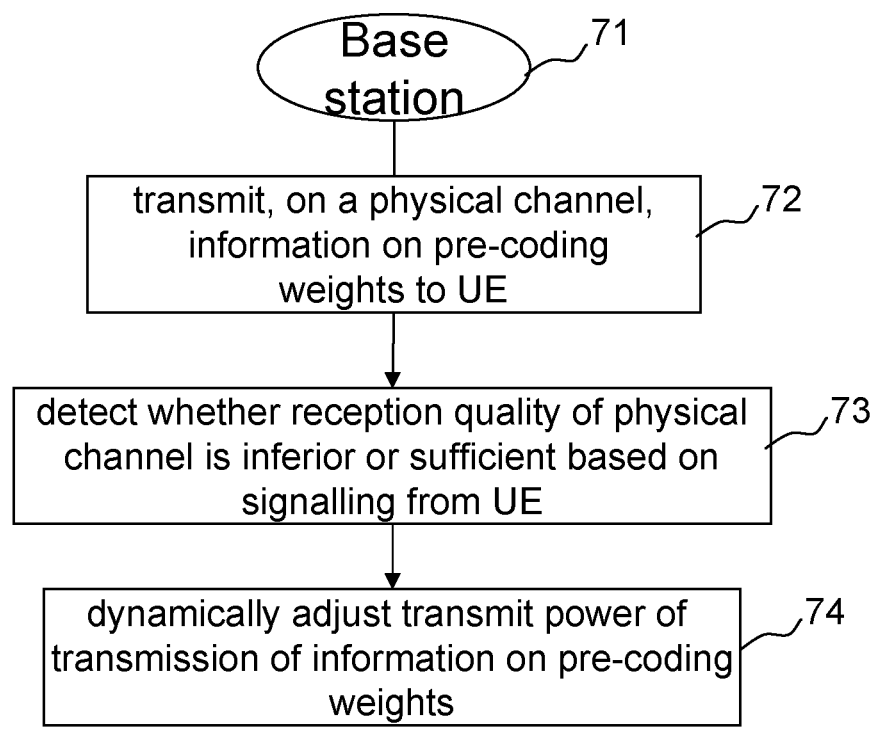
FIG. 8 is a flow diagram illustrating another exemplary embodiment of a method for use in a base station controlling user equipments configured for multi-antenna transmissions.

Once the base station 71 is made aware of whether the UE considers the reception quality of the physical channel to be sufficient or inferior, the base station may use this knowledge to dynamically adjust the transmit power for transmission of the pre-coding weight information to the UE. A method for this is illustrated in FIG. 8. The method comprises the step 72 explained above and a step 73 of detecting whether reception quality of the physical channel is inferior or sufficient based on signalling from the UE. The step 73 may e.g. be implemented as the step 73a or the step 73b in different variants of this embodiment. In a step 74 the base station dynamically adjusts the transmit power of the transmission of information on pre-coding weights based on whether the reception quality of the physical channel was detected to be inferior or sufficient in the step 73.

Figure 9:
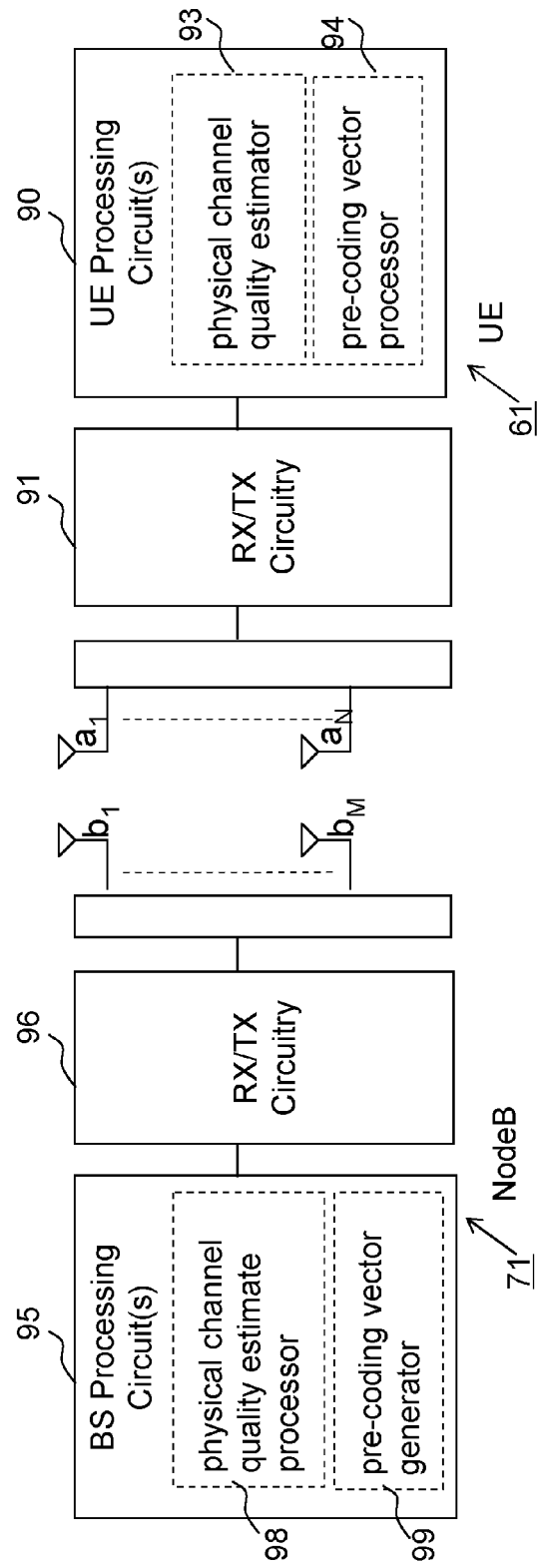
FIG. 9 is a schematic block diagram of an exemplary embodiment of base station and user equipment architectures.

FIG. 9 is a block diagram illustrating exemplary embodiments of the UE 61 and the base station 71 referred to above. The UE 61 illustrated in FIG. 9 comprises a plurality of antennas $a_1, \ldots, a_N$, transceiver circuitry 91 and processing circuitry 90, which may be configured to carry out a method for use in a UE according to any of the embodiments described above. The plurality of antennas $a_1, \ldots, a_N$ allows the UE to perform uplink transmissions according to a multi-antenna transmission technique such as closed loop uplink transmit diversity or uplink MIMO. The transceiver circuitry 91 comprises any type of wireless transceiver, such as a WCDMA transceiver, Long Term Evolution (LTE) transceiver, or Wireless Local Area Network (WLAN) transceiver. The processing circuitry 91 comprises one or more processors, hardware, firmware, or a combination thereof. According to an exemplary embodiment, the processing circuitry 90 includes a pre-coder for pre-coding signals to be transmitted. The processing circuitry 90 is according to one embodiment configured to estimate reception quality of a physical channel carrying pre-coding weight information to the UE 61 and configured to determine that the reception quality of the physical channel is inferior if the estimated reception quality is below a threshold and otherwise consider the reception quality of the physical channel to be sufficient. The processing circuitry 90 is in some exemplary embodiments also configured to apply the pre-coding weight information received on the physical channel for uplink transmission only if the reception quality of the physical channel is considered to be sufficient. Furthermore in some exemplary embodiments the processing circuitry is configured to initiate signalling of information about the estimated reception quality of the physical channel to the base station 71 controlling generation of pre-coding weights. The processing circuitry 90 may e.g. be configured to execute software instructions of one or several computer program products to implement different modules, such as exemplary modules 93 and 94 illustrated in FIG. 9. The module 93 is a physical channel quality estimator which is configured to estimate reception quality of a downlink channel to determine if a pre-coding vector indicated by the received pre-coding weight information is reliable or unreliable. The module 94 is a pre-coding vector processor which is configured to apply e.g. the pre-coding vector indicated by the received pre-coding weight information or some other pre-coding vector if the pre-coding weight information was not received with sufficient quality.

The exemplary base station 71 illustrated in FIG. 9 is a NodeB, which is configured to interact with the UE 61. The NodeB 71 comprises transceiver circuitry 96 and processing circuitry 95, which e.g. may be configured to carry out any of the methods illustrated in FIG. 7a, 7b or 8. The NodeB 71 also comprises antennas $b_1, \ldots, b_N$. The transceiver circuitry 96 is configured to transmit pre-coding weight information indicating pre-coding weights recommended for uplink transmission to the UE 61. The processing circuitry 95 comprises one or more processors, hardware, firmware, or a combination thereof. According to an exemplary embodiment, the processing circuitry 95 is configured to initiate transmission, on a physical channel, of information on pre-coding weights for uplink transmission to the UE 61. In some embodiments the processing circuitry 95 is also configured to detect whether the reception quality of the physical channel is inferior or sufficient based on signalling from the UE 61 via a TPC field of a secondary uplink pilot channel 34. Furthermore, in some embodiments the processing circuitry 95 is configured to detect whether the reception quality of the physical channel is inferior or sufficient based on a detected pilot pattern on a secondary uplink pilot channel from the UE 61, wherein different pilot patterns are indicative of whether the reception quality of the physical channel is sufficient or inferior. The processing circuitry 95 may e.g. be configured to execute software instructions of one or several computer program products to implement different modules, such as exemplary modules 98 and 99 illustrated in FIG. 9. The module 98 is a physical channel quality estimate processor which is configured to detect whether the reception quality of the physical channel is inferior or sufficient based on signalling from the UE 61. The module 99 is pre-coding vector generator for generating recommendations of pre-coding vectors for use in uplink transmission by the UE 61, which recommendations are communicated to the UE 61 by means of the pre-coding weight information transmitted to the UE 61.

As mentioned above, some of the embodiments described herein enable the UE to consider the pre-coding information feedback transmitted by the network if the estimated downlink quality is sufficient, i.e. above some quality threshold. The Node-B that generates the pre-coding vectors can be made aware of that the reception quality of the physical channel is inferior and thus also dynamically adjust the transmit power of the related physical downlink channel. In several embodiments this is achieved while still allowing the Node-B to use all symbols on the secondary uplink pilot (S-DPCCH) as pilots. In some embodiments applied pre-coding weights can furthermore be derived by the Node-Bs since the TPC field on the S-DPCCH is sent non-pre-coded. This can be used by both the Node-B controlling the generation of the pre-coding and the Node-Bs in the active set that are unaware of the pre-coding vector that the network has sent.

In the drawings and specification, there have been disclosed typical embodiments and, although specific terms are employed, they are used in a generic and descriptive sense only and not for purposes of limitation, the scope of the invention being set forth in the following claims.

The invention claimed is:

1. A method for use in a user equipment configured for multi-antenna transmissions in a telecommunication system, the method comprising:
   estimating reception quality of a physical channel carrying pre-coding weight information to the user equipment;
   determining that the reception quality of said physical channel is inferior if the estimated reception quality is below a threshold and otherwise considering the reception quality of said physical channel to be sufficient; and
   signaling information about the estimated reception quality of said physical channel to a base station controlling generation of pre-coding weights, wherein the information about the estimated reception quality of said physical channel is signaled to the base station via a transmit power control (TPC) field of a secondary uplink pilot channel.

2. The method of claim 1, further comprising applying the pre-coding weight information received on said physical channel for uplink transmission only if the reception quality of said physical channel is considered to be sufficient.

3. The method of claim 1, wherein the user equipment signals to the radio base station that the reception quality of said physical channel is considered to be sufficient by setting bits in said TPC field to a first predetermined bit combination.

4. The method of claim 1, wherein the user equipment signals to the radio base station that the reception quality of said physical channel is determined to be inferior by setting bits in said TPC field to a second predetermined bit combination.

5. The method of claim 1, wherein the user equipment signals to the radio base station that the reception quality of said physical channel is considered to be sufficient by using the same bits in said TPC field of the secondary uplink pilot channel as are used on a TPC command sent on a primary uplink pilot channel.

6. The method of claim 1, wherein the user equipment signals to the radio base station that the reception quality of said physical channel is determined to be inferior by setting the bits in said TPC field of the secondary uplink pilot channel to opposite values of TPC bits sent on a primary uplink pilot channel.

7. The method of claim 1, wherein the user equipment transmits said TPC field in the secondary uplink pilot channel only if the reception quality of said physical channel is considered to be sufficient.

8. A method for use in a base station for controlling user equipments configured for multi-antenna transmissions in a telecommunication system, the method comprising:

transmitting, on a physical channel, information on pre-coding weights for uplink transmission to a user equipment; and estimating whether reception quality of said physical channel is inferior or sufficient based on signaling information about the estimated reception quality of said physical channel from the user equipment to the base station controlling generation of pre-coding weights, wherein the information about the estimated reception quality of said physical channel is signaled to the base station via a transmit power control (TPC) field of a secondary uplink pilot channel.

9. The method of claim 8, wherein the base station detects that the reception quality of said physical channel is sufficient or inferior by detecting bits in said TPC field according to predetermined bit combinations indicative of sufficient or inferior reception quality of said physical channel.

10. The method of claim 8, wherein the base station detects that the reception quality of said physical channel is sufficient by detecting bits in said TPC field of the secondary uplink pilot channel that have the same values as a those in a TPC command received on a primary uplink pilot channel.

11. The method of claim 8, wherein the base station detects that the reception quality of said physical channel is inferior by detecting bits in said TPC field of the secondary uplink pilot channel that have opposite values of TPC bits received on a primary uplink pilot channel.

12. The method of claim 8, further comprising exploiting bits in said TPC field, which are used for indication of sufficient or inferior reception quality of said physical channel, for channel estimation.

13. The method of claim 8, wherein the base station detects that the reception quality of said physical channel is sufficient or inferior by using power detection to detect whether or not the user equipment has transmitted said TPC field, wherein sufficient reception quality of said physical channel is detected if the base station detects that the user equipment has transmitted said TPC field and inferior reception quality of said physical channel is detected if the base station detects that the user equipment has not transmitted said TPC field.

14. A base station for controlling user equipments configured for multi-antenna transmissions in a telecommunication system, wherein the base station is further configured to:

transmit, on a physical channel, information on pre-coding weights for uplink transmission to a user equipment; and estimate whether the reception quality of said physical channel is inferior or sufficient based on signaling information about the estimated reception quality of said physical channel from the user equipment to the base station controlling generation of pre-coding weights, wherein the information about the estimated reception quality of said physical channel is signaled to the base station via a transmit power control (TPC) field of a secondary uplink pilot channel.

15. The base station of claim 14, wherein the base station is configured to detect that the reception quality of said physical channel is sufficient or inferior by detecting bits in said TPC field according to predetermined bit combinations indicative of sufficient or inferior reception quality of said physical channel.

16. The base station of claim 14, wherein the base station is configured to detect that the reception quality of said physical channel is sufficient by detecting bits in said TPC field of the secondary uplink pilot channel that have the same values as a TPC command received on a primary uplink pilot channel.

17. The base station of claim 14, wherein the base station is configured to detect that the reception quality of said physical channel is inferior by detecting bits in said TPC field of the secondary uplink pilot channel that have opposite values of TPC bits received on a primary uplink pilot channel.

18. The base station of claim 14, wherein the base station is configured to exploit bits in said TPC field, which are used for indication of sufficient or inferior reception quality of said physical channel, for channel estimation.

19. The base station of claim 14, wherein the base station is configured to detect that the reception quality of said physical channel is sufficient or inferior by using power detection to detect whether or not the user equipment has transmitted said TPC field, wherein the base station is configured to detect sufficient reception quality of said physical channel if the base station detects that the user equipment has transmitted said TPC field and inferior reception quality of said physical channel if the base station detects that the user equipment has not transmitted said TPC field.

20. A user equipment configured for multi-antenna transmissions in a telecommunication system, the user equipment comprising a plurality of antennas, transceiver circuitry and processing circuitry, wherein said processing circuitry is configured to:

estimate reception quality of a physical channel carrying pre-coding weight information to the user equipment; and determine that the reception quality of said physical channel is inferior if the estimated reception quality is below a threshold and otherwise consider the reception quality of said physical channel to be sufficient;

wherein said transceiver circuitry is configured to signal information about the estimated reception quality of said physical channel to a base station controlling generation of pre-coding weights, wherein the transceiver circuitry is configured to signal the information about the estimated reception quality of said physical channel to the base station via a transmit power control (TPC) field of a secondary uplink pilot channel.

21. The user equipment of claim 20, wherein said processing circuitry is configured to apply the pre-coding weight information received on said physical channel for uplink transmission only if the reception quality of said physical channel is considered to be sufficient.

* * * * *